United States Patent Office 3,262,978
Patented July 26, 1966

3,262,978
O-ARYLAMINO- AND -ARALKYL-AMINO-
ALKYLHYDROXYL-AMINES
Jerry E. Robertson, Milwaukee, Wis., assignor to Colgate-
Palmolive Company, New York, N.Y., a corporation of
Delaware
No drawing. Original application June 19, 1963, Ser. No.
288,903. Divided and this application July 22, 1965,
Ser. No. 485,664
7 Claims. (Cl. 260—570.5)

This is a division of application Serial No. 288,903, filed June 19, 1963.

This invention relates to novel chemical compounds having useful pharmacological properties.

According to the present invention there are provided novel O-phenylaminoalkylhydroxylamines and O-phenylalkylaminoalkylhydroxylamines of the formula

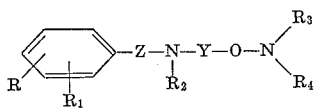

wherein R and $R_1$ represent the same or different groups such as hydrogen, hydroxy, nitro, lower alkoxy groups such as methoxy, ethoxy, propoxy and isopropoxy, lower alkyl groups such as methyl, ethyl, and propyl, thio-lower alkyl groups such as thiomethyl, halo groups and particularly the chloro and bromo groups, halo-lower alkyl groups such as trifluoromethyl, and groups in which R and $R_1$ are joined to each other to form lower alkylenedioxy groups such as 3,4-methylenedioxy and 3,4-ethylenedioxy, $R_2$ is hydrogen, a lower alkyl such as methyl, ethyl or propyl or a phenyl-lower alkyl such as benzyl and phenethyl, $R_3$ and $R_4$ are hydrogen or lower alkyls such as methyl, ethyl and propyl, Z is a single chemical bond or a straight or branched lower alkylene such as methylene, ethylene, propylene and isopropylene and Y is a straight or branched lower alkylene containing at least two carbons in a chain between the nitrogen and oxygen atoms it is bonded to such as ethylene, propylene, isopropylene and butylene.

Some of the compounds of this invention can be produced by reacting a phenylaminoalkylhalide or a phenylalkylaminoalkylhalide with an alkali metal salt of a suitable alkanone or alkanal oxime to produce an intermediate phenylaminoalkyloxime or phenylalkylaminoalkyloxime which upon hydrolysis yields O-phenylaminoalkylhydroxylamine or O-phenylalkylaminoalkylhydroxylamine. This process can be represented as follows:

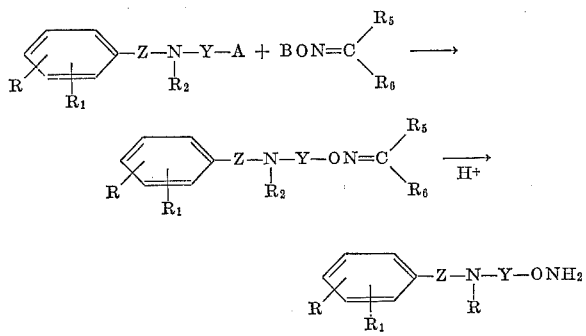

wherein R, $R_1$, $R_2$, Z and Y have the significance previously assigned, $R_5$ and $R_6$ are hydrogen or lower alkyls and can be the same or different, A is a reactive halogen such as bromine or chlorine and B is a reactive alkali metal such as sodium or potassium.

Representative of the phenylaminoalkylhalides and phenylalkylaminoalkyl halides which can be used as starting materials in the process are Phenylaminoethylchloride,
Beta-(N-2,3,-di-methoxyphenylmethylamino)ethylbromide,
Beta-[N-(beta-p-methylphenylethyl)-N-methylamino]ethylchloride,
Beta-(N-3,4-methylenedioxyphenylmethylamino)ethylchloride,
Beta-(N-benzyl-N-methylamino)ethylchloride,
Beta-(N-p-chlorobenzyl-N-methylamino)ethylchloride,
Beta-(N-p-methoxybenzyl-N-methylamino)ethylchloride,
Beta-(N-2-phenethyl-N-methylamino)ethylchloride,
Gamma-(N-benzyl-N-methylamino)propylchloride,
4-(N-benzyl-N-methylamino)butylchloride,
Beta-methyl-beta-(N-benzyl-N-methylamino)ethylchloride,
Beta-(N,N-dibenzylamino)ethylchloride,
Beta-(N-phenyl-N-methylamino)ethylchloride,
Beta-(N-o-thiomethylbenzyl-N-methylamino)ethylchloride,
Beta-(N-p-acetyloxybenzyl-N-methylamino)ethylchloride, and
Gamma-(N-trifluoromethylphenylamino)propylchloride.

The preparation of such compounds is shown in J. Org. Chem. 26, 3338 (1961).

Alkanone oximes and alkanal oximes which can be used in the process, in the form of alkali metal salts, can be represented by formaldoxime, acetaldoxime, propionaldoxime, acetoxime, 2-butanone oxime, 3-pentanone oxime, and butyrone oxime. The sodium and potassium salts of the oximes are preferred. Such salts can be prepared by reacting sodium hydride or potassium hydride with the oxime under anhydrous conditions in a suitable liquid reaction medium such as ethanol. Air is excluded from the reaction. The desired salt can then be recovered such as by evaporation to dryness.

The alkali metal salt of the oxime and the phenylaminoalkylhalide or phenylalkylaminoalkylhalide can be reacted in about equimolar amounts in a suitable liquid reaction medium such as dry xylene or hexane. The reaction is advisably promoted by using elevated reaction conditions and, particularly, reflux conditions. After the reaction is terminated the reaction mixture can be filtered and extracted with aqueous hydrochloric acid. After treating the aqueous extracts with a base, such as potassium carbonate, the desired product can be extracted with ether, the ether evaporated and the residue distilled.

Some of the intermediate products produced in this way are

Acetone-O-[beta-(N-benzyl-N-methylamino)ethyl]oxime,
Acetone-O-[beta-(N-p-chlorobenzyl-N-methylamino)ethyl]oxime,
Acetone-O-[beta-(N-p-methoxybenzyl-N-methylamino)ethyl]oxime,
Acetone-O-[beta-(N-2-phenethyl-N-methylamino)ethyl]oxime,
Acetone-O-[gamma-(N-benzyl-N-methylamino)propyl]oxime,
Acetone-O-[beta-methyl-beta-(N-benzyl-N-methylamino)ethyl]oxime,
Acetone-O-[beta-(N,N-dibenzylamino)ethyl]oxime,
Acetone-O-[beta-(N-phenyl-N-methylamino)ethyl]oxime,
Acetone-O-[beta-(N-o-thiomethylbenzyl-N-methylamino)ethyl]oxime,
O-[beta-N-benzylamino)ethyl]formaldoxime,
O-[beta-N-phenethylamino)ethyl]acetaldoxime, and 3-pentanone-O-[gamma-(N-p-methoxybenzylamino)propyl]oxime.

Hydrolysis of the O-(substituted-aminoalkyl)-oximes to the hydroxylamines can be readily achieved in dilute aqueous acid such as aqueous hydrochloric acid. Thus, about 0.1 mole of the substituted oxime can be added to 100 ml. of 18% hydrochloric acid and the mixture steam distilled until 50 ml. of distillate is collected. The residual solution is concentrated to dryness under reduced pressure and the residue recrystallized from ethanol-ether or treated with aqueous base. In the latter case, two ether extractions are made, the combined organic layers are dried over sodium sulfate and added to an ethanolic acid solution. Dilution with ether gives a solid salt which is recrystallized.

Among the O-phenylaminoalkylhydroxylamines and O-phenylalkylaminohydroxylamines which can be produced as described are O-[beta-(N-benzyl-N-methylamino)ethyl]hydroxylamine,
O-[beta-(N-p-chlorobenzyl-N-methylamino)ethyl]hydroxylamine,
O-[beta-(N-p-methoxybenzyl-N-methylamino)ethyl]hydroxylamine,
O-[beta-(N-2-phenylethyl-N-methylamino)ethyl]hydroxylamine,
O-[gamma-(N-benzyl-N-methylamino)propyl]hydroxylamine,
O-[beta-(N-o-thiomethylbenzyl-N-methylamino)ethyl]hydroxylamine,
O-[beta-(N-3,4-methylenedioxyphenylmethylamino)ethyl]hydroxylamine,
O-[beta-(N,N-dibenzylamino)ethyl]hydroxylamine,
O-[gamma-(N-benzyl-N-methylamino)propyl]hydroxylamine, and
O-(N-benzylaminomethyl)hydroxylamine.

These compounds readily form acid addition salts with inorganic and organic acids such as hydrochloric acid, sulfuric acid, maleic acid, fumaric acid, citric acid, acetic acid, glutamic acid and tartaric acid.

By alkylation of the hydroxylamines of the formula

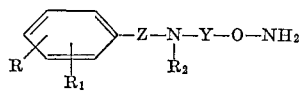

there are produced the compounds of the formula

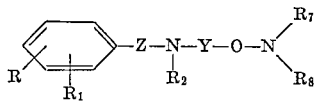

in which R, $R_1$, $R_2$, Z and Y have the assigned significance, $R_7$ is lower alkyl, and $R_8$ is hydrogen or lower alkyl; however, if $R_2$ is hydrogen at the start it may well be alkylated at the same time.

The alkylation reaction can be effected using conventional conditions and reactants. Lower alkyl halides are particularly suitable reactants. Representative of the compounds which can be produced by alkylation are O-[beta-(N-benzyl-N-methylamino)ethyl]-N-isopropylhydroxylamine,
O-[beta-(N-phenyl-N-methylamino)ethyl]-N-methylhydroxylamine,
O-[beta-(N-benzyl-N-methylamino)ethyl]-N,N-dimethylhydroxylamine,
O-[beta-(N-p-chlorobenzyl-N-methylamino)ethyl]-N-ethylhydroxylamine and
O-[beta-(N-2-phenethyl-N-methylamino)ethyl]-N-propylhydroxylamine.

The N-alkylated hydroxylamines also form acid addition salts as previously described herein.

The O-phenylaminoalkylhydroxylamines and O-phenylalkylaminoalkylhydroxylamines provided by this invention inhibit the enzyme 5-hydroxytryptophan decarboxylase. A result of inhibiting this enzyme is a decrease in amounts of catechol amines such as dopamine (3,4-dihydroxyphenethylamine), norepinephrine, epinephrine and serotonin.

These compounds have antihypertensive and mood relaxant or tranquilizing properties in animals. The compounds thus would be valuable in the treatment of cardiovascular diseases and a variety of mental disturbances such as schizophrenia, agitated depressions, anxiety and tension states.

The hydroxylamine compounds of this invention may be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration to a patient or, instead, the powders may be added to suitable foods and liquids, including water, to facilitate administration.

The powders also may be used to make tablets, or to fill gelatin capsules. Suitable lubricants like magnesium stearate, binders such as gelatin, and distintegrating agents like sodium carbonate in combination with citric acid may be used to form the tablets.

Unit dosage forms such as tablets and capsules may contain any suitable predetermined amount of one or more of the hydroxylamine compounds advisably as a nontoxic acid addition salt, and may be administered one or more at a time at regular intervals. Such unit dosage forms, however, should generally contain a concentration of 0.1% to 50% by weight of one or more of the active compounds.

A typical tablet may have the composition:

| | Mg. |
|---|---|
| (1) O-[2-(N-benzyl-N-methylamino)ethyl]hydroxylamine HCl | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

| | Mg. |
|---|---|
| (1) O-[beta-(N-2-phenethyl - N-methylamino)-ethyl]-hydroxylamine HCl | 5 |
| (2) Lactose, U.S.P. | 200 |
| (3) Starch, U.S.P. | 16 |
| (4) Talc, U.S.P. | 8 |

The oral route is preferred to administering the active hydroxylamines.

The following examples are presented to illustrate preparation of the compounds.

EXAMPLE 1

*Acetone-O-[β-(N-benzyl-N-methylamino)ethyl]oxime*

A solution was prepared under nitrogen from 7.3 g. (0.10 mole) acetone oxime and 8.7 g. of 55.5% (0.20 mole) sodium hydride in oil in 100 ml. ethanol and then concentrated in vacuo to dryness. The residue was suspended in 200 ml. dry xylene and 22g. (0.10 mole) β-(N-benzyl-N-methylamino)ethylchloride hydrochloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate and the mixture was extracted three times with ether. The combined and sodium sulfate dried organic phases were concentrated in vacuo and the residue distilled to provide 15.5 g. (68%) of the product, B.P. 78–86° C./0.025 mm.

EXAMPLE 2

*Acetone-O-[β-(N-p-chlorobenzyl-N-methyl-amino)ethyl]oxime*

A solution was prepared under nitrogen from 7.3 g. (0.10 mole) acetone oxime and 8.7 g. of 55.5% (0.20 mole) sodium hydride in oil in 100 ml. ethanol and then concentrated in vacuo to dryness. The residue was suspended in 200 ml. dry xylene and 25.4 g. (0.10 mole) β-(N-p-chlorobenzyl - N-methylamino)ethylchloride hydrochloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate, and the mixture was extracted three times with ether. The combined and sodium sulfate dried organic phases were concentrated in vacuo and the residue distilled to provide 18.5 g. (73%) of the product, B.P. 100–110° C./0.05 mm.

EXAMPLE 3

*Acetone-O-[β-(N-p-methoxybenzyl-N-methyl-amino)ethyl]oxime*

A solution was prepared under nitrogen from 7.3 g. (0.10 mole) acetone oxime and 8.7 g. of 55.5% (0.20 mole) sodium hydride in oil in 100 ml. ethanol and then concentrated in vacuo to dryness. The residue was suspended in 200 ml. dry xylene and 25 g. (0.10 mole) β-(N-p-methoxybenzyl-N-methylamino)ethylchloride hydrochloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate, and the mixture was extracted three times with ether. The combined and sodium sulfate dried organic phases were concentrated in vacuo and the residue distilled to provide 16.5 g. (66%) of the product, B.P. 113–120° C./0.25 mm.

EXAMPLE 4

*Acetone-O-[β-(N-2-phenethyl-N-methylamino)ethyl]-oxime*

A solution was prepared under nitrogen from 7.3 g. (0.10 mole) acetone oxime and 8.7 g. of 55.5% (0.20 mole) sodium hydride in oil in 100 ml. ethanol and then concentrated in vacuo to dryness. The residue was suspended in 200 ml. dry xylene and 23.4 g. (0.10 mole) β - (N-2-phenethyl-N-methylamino)ethylchloride hydrochloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate, and the mixture was extracted three times with ether. The combined and sodium sulfate dried organic phases were concentrated in vacuo and the residue distilled to provide 16.5 g. (70%) of the product, B.P. 80–100° C./0.04 mm.

EXAMPLE 5

*Acetone-O-[γ-(N-benzyl-N-methylamino)propyl]oxime*

A solution was prepared under nitrogen from 7.3 g. (0.10 mole) acetone oxime and 4.35 g. of 55.5% (0.10 mole) sodium hydride in oil in 100 ml. ethanol and then concentrated in vacuo to dryness. The residue was suspended in 200 ml. dry xylene and 20 g. (0.10 mole) γ - (N - benzyl - N - methylamino)propylchloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate, and the mixture was extracted three times with ether. The combined and sodium sulfate dried organic phases were concentrated in vacuo and the residue distilled to provide 16.7 g. (72%) of the product, B.P. 82–90° C./0.05 mm.

EXAMPLE 6

*Acetone-O-[β-(N,N-dibenzylamino)ethyl]oxime*

A solution was prepared under nitrogen from 7.3 g. (0.10 mole) acetone oxime and 8.7 g. of 55.5% (0.20 mole) sodium hydride in oil in 100 ml. ethanol and then concentrated in vacuo to dryness. The residue was suspended in 200 ml. dry xylene and 29.6 g. (0.10 mole) β-(N,N-dibenzylamino)ethylchloride hydrochloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate, and the mixture was extracted three times with ether. The combined and sodium sulfate dried organic phases were concentrated in vacuo and the residue distilled to provide 24.5 g. (82%) of the product, B.P. 137–140° C./0.025 mm.

EXAMPLE 7

*Acetone-O-[β-(N-phenyl-N-methylamino)ethyl]oxime*

A solution was prepared under nitrogen from 7.3 g. (0.10 mole) acetone oxime and 4.35 g. of 55.5% (0.10 mole) sodium hydride in oil in 100 ml. ethanol and then concentrated in vacuo to dryness. The residue was suspended in 200 ml. dry xylene and 16.9 g. (0.10 mole) β - (N - phenyl - N - methylamino)ethylchloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate, and the mixture was extracted three times with ether. The combined and sodium sulfate dried organic phases were concentrated in vacuo and the residue distilled to provide 12.2 g. (59%) of the product, B.P. 78–88° C./0.4 mm.

EXAMPLE 8

*Acetone-O-[β-(N-o-thiomethylbenzyl-N-methylamino)ethyl]oxime*

A solution was prepared under nitrogen from 7.3 g. (0.10 mole) acetone oxime and 8.7 g. of 55.5% (0.20 mole) sodium hydroxide in oil in 100 ml. ethanol and then concentrated in vacuo to dryness. The residue was suspended in 200 ml. dry xylene and about 0.10 mole of freshly prepared β - (N - o - thiomethylbenzyl-N-methylamino)ethylchloride hydrochloride was added in one portion. The mixture was refluxed and stirred for 24 hours, cooled and filtered. The filtrate was extracted three times with 20 ml. portion of 18% aqueous hydrochloric acid. The combined aqueous phases were treated with excess potassium carbonate, and the mixture was extracted three times with ether. The combined and sodium sulfate dried organic phases were concentrated in vacuo and the residue distilled to provide 19.8 g. (74%) of the product, B.P. 127–130° C./0.025 mm.

EXAMPLE 9

*O-[β-(N-benzyl-N-methylamino)ethyl]hydroxylamine hydrochloride*

A solution of 15.6 g. (0.075 mole) of acetone-O-[β-(N-benzyl-N-methylamino)ethyl]oxime in 90 ml. 18% aqueous hydrochloric acid was steam distilled until 50 ml. of distillate was collected. The residual solution was taken to dryness in vacuo and the residue was recrystallized twice from ethanol to provide 10 g. (52%) of product, M.P. 190–192° C.

*Analysis.*—Calcd. for $C_{10}H_{28}Cl_2N_2O$: Cl, 28.00; N, 11.06. Found: Cl, 27.79; N, 11.07.

EXAMPLE 10

*O-[β-(N-p-chlorobenzyl-N-methylamino)ethyl]-hydroxylamine hydrochloride*

A solution of about 18 g. acetone-O-[β-(N-p-chlorobenzyl-N-methylamino)ethyl]oxime in 100 ml. 18% aqueous hydrochloric acid was steam distilled until about 50 ml. of distillate was collected. The residual solution was taken to dryness in vacuo and the residue was recrystallized from ethanol to provide 10.3 g. of product, M.P. 205–207° C.

*Analysis.*—Calcd. for $C_{10}H_{17}Cl_3N_2O$: C, 41.75; H, 5.96; Cl, 24.66; N, 9.74. Found: C, 41.81; H, 6.03; Cl, 23.95; N, 9.61.

EXAMPLE 11

*O-[β-(N-p-methoxybenzyl-N-methylamino)ethyl]-hydroxylamine hydrochloride*

A solution of about 16 g. of acetone-O-[β-(N-p-methoxybenzyl-N-methylamino)ethyl]oxime in 100 ml. 18% aqueous hydrochloric acid was steam distilled until about 50 ml. of distillate was collected. The residual solution was taken to dryness in vacuo and the residue was crystallized from ethanol to provide 11.2 g. of product, M.P. 194–195° C.

*Analysis.*—Calcd. for $C_{11}H_{20}Cl_2N_2O_2$: C, 46.63; H, 7.12; Cl, 25.04; N, 9.89. Found: C, 46.63; H, 7.06; Cl, 24.56; N, 9.69.

EXAMPLE 12

*O-[β-(N-2-phenethyl-N-methylamino)ethyl]-hydroxylamine hydrochloride*

A solution of about 16 g. of acetone-O-[β-(N-2-phenethyl-N-methylamino)ethyl]oxime in 100 ml. 18% aqueous hydrochloric acid was steam distilled until about 50 ml. of distillate was collected. The residual solution was taken to dryness in vacuo and the residue was crystallized from ethanol-ether to provide 14.7 g. of product, M.P. 171–174° C.

*Analysis.*—Calcd. for $C_{11}H_{20}Cl_2N_2O$: C, 49.45; H, 7.54; Cl, 25.57; N, 10.48. Found: C, 49.21; H, 7.57; Cl, 26.06; N, 10.28.

EXAMPLE 13

*O-[γ-(N-benzyl-N-methylamino)propyl]-hydroxylamine difumarate*

A solution of about 14 g. of acetone-O-[γ-N-benzyl-N-methylamino)propyl]oxime in 100 ml. 18% aqueous hydrochloric acid was steam distilled until about 50 ml. of distillate was collected. The residual solution was taken to dryness and the residue was treated with aqueous potassium hydroxide and extracted twice with ether. A solution of about 15 g. fumaric acid in ethanol was added to the separated, combined and sodium sulfate dried organic layers. The precipitate which formed was collected and dried to provide 9.4 g. of product, M.P. 103–105° C.

*Analysis.*—Calcd. for $C_{19}H_{26}N_2O$: N, 6.57. Found: N, 6.28.

EXAMPLE 14

*O-[β-(N-o-thiomethylbenzyl-N-methylamino)ethyl]-hydroxylamine dimaleate*

A solution of 19 g. of acetone-O-[β-N-thiomethylbenzyl-N-methylamino)ethyl]oxime in 100 ml. 18% aqueous hydrochloric acid was steam distilled until about 50 ml. of distillate was collected. The residual solution was taken to dryness in vacuo and the residue treated with aqueous sodium hydroxide and extracted twice with ether. The separated and combined organic layers were dried over sodium sulfate and a solution of 16.5 g. of maleic acid in ethanol was added. A solid formed which collected and dried to provide 26 g. of product, M.P. 86–89° C.

*Analysis.*—Calcd. for $C_{19}H_{26}N_2O_9S$: Maleic acid, 50.63. Found: Maleic acid, 50.59.

Various changes and modifications of the invention can be made and, to the extent that such variations incorporate the spirit of this invention, they are intended to be included within the scope of the appended claims.

What is claimed is:

1. A compound of the formula

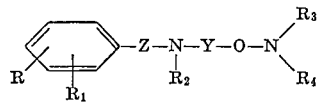

and acid addition salts thereof wherein R and $R_1$ are members of the group consisting of hydrogen, hydroxy, nitro, lower alkoxy, lower alkyl, bromo and chloro, trifluoromethyl, thiolower alkyl, and groups in which R and $R_1$ are joined to each other to form lower alkylenedioxy groups, $R_2$ is a member of the group consisting of hydrogen, lower alkyl and phenyl-lower alkyl, $R_3$ and $R_4$ are members of the group consisting of hydrogen and lower alkyl, Z is a member of the group consisting of a single chemical bond and lower alkylene groups, and Y is a lower alkylene group having two to four carbons.

2. O-[beta-(N-benzyl-N-methylamino)ethyl]hydroxylamine.

3. O-[beta-(N-p-chlorobenzyl-N-methylamino)ethyl]-hydroxylamine.

4. O-[beta-(N-p-methoxybenzyl-N-methylamino)-ethyl]hydroxylamine.

5. O-[beta-(N-2-phenethyl-N-methylamino)ethyl]-hydroxylamine.

6. O-[gamma-(N-benzyl-N-methylamino-propyl]hydroxylamine.

7. O-[beta-(N-o-thiomethylbenzyl-N-methylamino)-ethyl]hydroxylamine.

References Cited by the Examiner

Holland et al.: "Journal Chemical Society," London, 1948, pages 182–6.

CHARLES B. PARKER, *Primary Examiner.*

ROBERT V. HINES, *Assistant Examiner.*